350-166. SR 09-20-71 OR 3,606,521

Sept. 20, 1971 S. W. ATHEY 3,606,521

APPARATUS FOR COMPENSATING FOR ANGULAR VARIATION OF DICHROIC MIRROR CHARACTERISTICS

Filed March 11, 1970 4 Sheets-Sheet 1

INVENTOR.
SKIPWITH W. ATHEY

BY Limbach, Limbach & Sutton

ATTORNEYS

Sept. 20, 1971 S. W. ATHEY 3,606,521

APPARATUS FOR COMPENSATING FOR ANGULAR VARIATION OF DICHROIC MIRROR CHARACTERISTICS

Filed March 11, 1970 4 Sheets-Sheet 2

INVENTOR.
SKIPWITH W. ATHEY
BY Limbach, Limbach and Sutton
ATTORNEYS

INVENTOR
BY SKIPWITH W. ATHEY
Limbach, Limbach and Sutton
ATTORNEYS

INVENTOR.
SKIPWITH W. ATHEY
BY Limbach, Limbach and Sutton
ATTORNEYS

United States Patent Office 3,606,521
Patented Sept. 20, 1971

3,606,521
APPARATUS FOR COMPENSATING FOR ANGULAR VARIATION OF DICHROIC MIRROR CHARACTERISTICS

Skipwith W. Athey, Portola Valley, Calif., assignor to International Video Corporation, Sunnyvale, Calif.

Filed Mar. 11, 1970, Ser. No. 18,466
Int. Cl. G02b 5/28
U.S. Cl. 350—166 3 Claims

ABSTRACT OF THE DISCLOSURE

An optical filter including a dichroic transmission filter and a dichroic reflecting mirror, the transmission filter having substantially the same light-passing characteristics so that as the angle of incidence between a beam and the reflecting mirror is varied, variation in the reflection characteristics of the optical system is substantially reduced.

BACKGROUND OF THE INVENTION

This invention relates to optical systems and more particularly to an optical system for a color television camera.

In many forms of color television cameras, a plurality of color separation images of a given subject are formed, the separate images generally containing blue, red, and green wave bands of light. Separate images are directed onto the faces of suitable television pickup tubes such as vidicon tubes, orthicon tubes, or lead oxide vidicon tubes or the like. Various types of optical systems have been proposed for forming various separation images, the most common utilizing some form of dichroic beam splitter inserted in the path of the single incoming beam of light.

Considering the separation of the red wave band of light, one prior art system employs a pair of dichroic mirrors, one having reflection characteristics so as to shape the short-wavelength limit of the red spectrum region and a second reflecting mirror to shape the long wavelength end of the red spectrum region. Such a system is shown in FIG. 1 having an incoming light beam 2 being incident on a first dichroic reflecting mirror 4, the beam being reflected along path 6 to the second dichroic reflecting mirror 8 and thence along path 10 to a pickup tube 12. FIG. 2 shows the reflection and transmission characteristics of dichroic mirrors 4 and 8. Curve 14 shows the short wave length reflection characteristic of mirror 4, while curve 16 shows the complementary transmission characteristic of mirror 4. The two curves cross in this example at about 580 nanometers. Curve 18 shows the long-wavelength reflecting characteristic of mirror 8, while complementary curve 20 shows the transmission characteristics of mirror 8. The curves cross in this example at about 655 nanometers. The "red" beam 10 has a spectrum which is defined by the area under curves 14 and 18 which determine its short wavelength and long-wavelength boundaries respectively.

Depending on the aperture and angular field coverage of the optical system in question, it is possible for some of the rays making up the beams incident on mirrors 4 and 8 to vary in direction 6 to 10 degrees or more from the direction of the beam center. It has been found that the reflection characteristics of dichroic mirrors vary as the incident angle of the beam is varied. For example, as the angle of incidence decreases, the reflection characteristic is shifted upward in wavelength. Conversely, an increase in the angle of incidence tends to shift the spectral characteristic downward in wavelength. Thus the characteristic shown in FIG. 2 is correct only for a single angle of incidence, for example, the center of an incident beam.

FIG. 3 shows the shifting of the upper and lower wavelength reflection characteristics of dichroic mirrors 4 and 8 as the angle of incidence shifts to larger and smaller angles with respect to the beam center. Also shown on FIG. 3 is the relative sensitivity versus frequency of a vidicon pickup tube and of a lead oxide vidicon pickup tube.

It will be observed that while the typical vidicon used for "live" television pickup has a peak toward the center of the visible spectrum, it slopes down slowly at the short and long wavelength ends of the spectrum. On the other hand, the standard lead oxide vidicon has a much more pronounced peak and a much sharper rolloff at the high wavelength end, reaching zero sensitivity at about 640 nanometers. The net sensitivity of a pickup tube is the product of the tube's intrinsic sensitivity multiplied times the transmission characteristics of the optical system between the tube and the scene. When such a system picks up a surface of uniform brightness which reflects some red light, it can be seen that for light from one side of the area picked up where the angle of incidence of light to the dichroic mirrors is smaller than for the center of the area and the spectral response thus shifts toward longer wavelength, the output signal for the red channel becomes less than for the opposite side of the area picked up where the angles are greater than for the center of the area.

Thus the employment of prior art beam splitting approaches with the lead oxide vidicon tube may result in an undesirable area to area shading in the light output of the tube due to the effect shown above. For various arrangements the shading may be from side to side or from top to bottom of the scene.

One approach to the solution of the shading problem is to modify the amplification for the signal out of the color channel from point to point within the picture by a sawtooth waveform so that the effective sensitivity is increased for the side at which the minimum amount of light is received. This has the drawback of giving a different signal-to-noise ratio for the two sides. With the extreme correction need in the red channel case cited the noise difference is very apparent. The method is quite satisfactory for the small amount of shading found in the other color channels.

SUMMARY OF THE INVENTION

In describing dichroic-mirror filters and mirrors, it is a convention in the art to characterize the selectivity by referring to the transmission characteristic of the device, even though it is used only as a reflector. Thus a short-wave-pass mirror has a short-wave-pass transmission characteristic nad a short-wave-reject or long-wave-pass effect on the reflected beam.

A short-wave-pass red-reflector dichroic mirror which has a long-wave-pass effect on the reflected beam with a 50% characteristic point lying on the short-wavelength end of the desired red spectrum is arranged at a predetermined angle to an incident image beam and a compensating transmission dichroic filter is arranged so as to form the opposite angle to the incident or reflected beam. The dichroic transmission filter is chosen to have as closely as possible the inverse characteristic of the reflection dichroic mirror, that is, the 50% transmission points of the two mirrors fall at essentially the same wavelength and the filter transmits the same long wavelengths that the reflector mirror reflects. A second mirror which may be of conventional non-color selective design, is then used to reflect the compensated beam onto the lens and pickup tube. While the invention will be described for the purpose of full disclosure in connection with television camera optics, it will be apparent that the invention has broader applications and is applicable to other optical systems.

DESCRIPTION OF THE PREFERRED EMBODIMENTS

Figures 3, 4, 5:
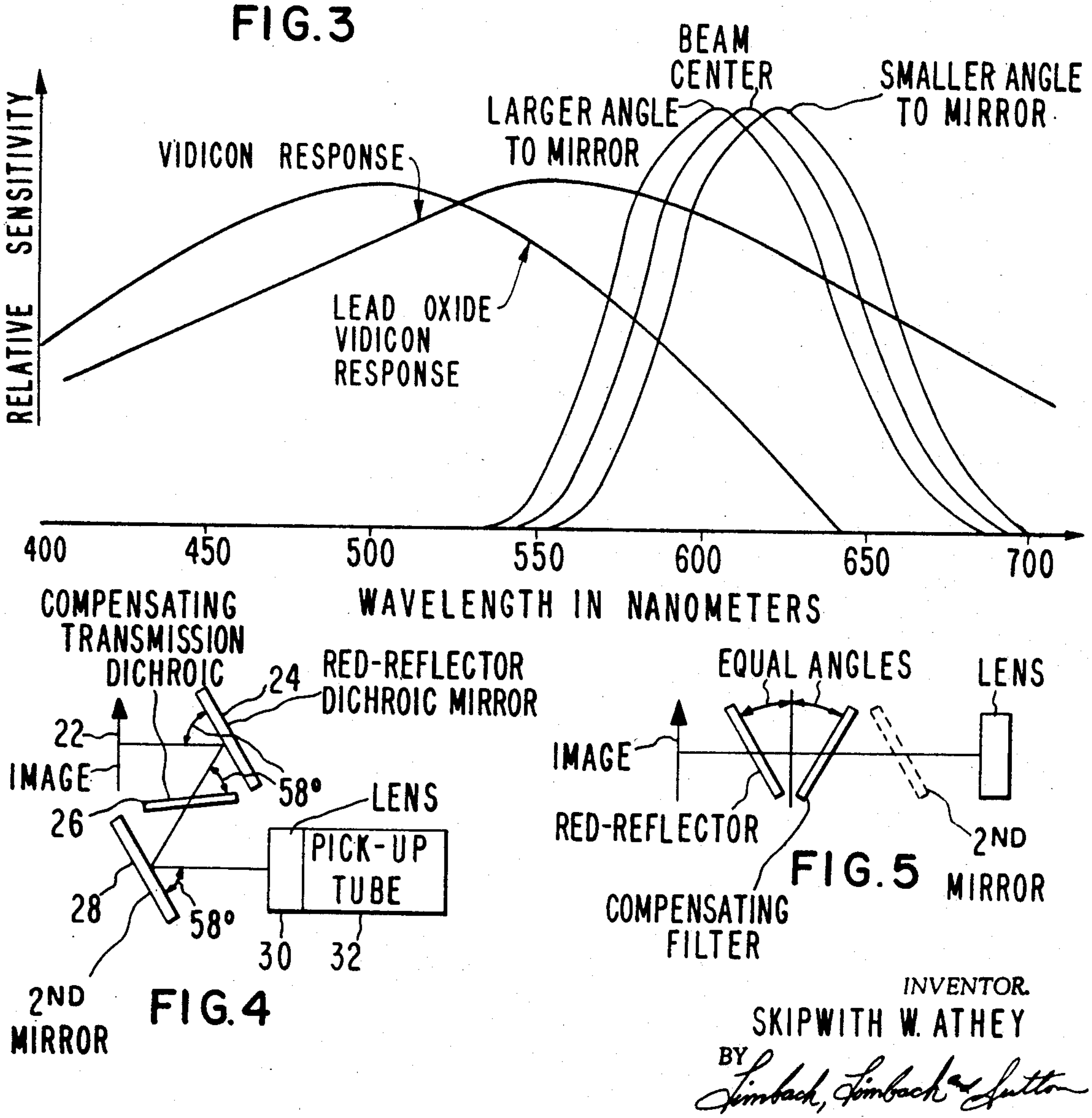
FIG. 3 shows the transmission characteristics of FIG. 2 versus wavelength of a dichroic mirror for several different incident angles superimposed upon a graph of the sensitivities of vidicon and lead oxide vidicon tubes.
FIG. 4 shows an embodiment of a dichroic mirror system according to the present invention.
FIG. 5 shows a modification of an embodiment of the dichroic mirror system according to this invention which is useful in understanding the invention.

Referring now to FIG. 4 wherein a preferred embodiment of the lens system according to this invention is shown, and image 22 provides a beam which is incident on a red reflector dichroic mirror 24. In the example shown the mirror forms a 58° angle between the center of the imaging beam and the mirror surface. A compensating transmission dichroic filter 26 is placed in the path of the reflective image beam. The beam is then reflected again by a common totally reflecting mirror 28 onto the lens 30 of a pickup tube 32. Mirror 28 also forms a 58° angle between its surface and the center of the reflected beam. The characteristics of the mirror 24 and filter 26 are discussed below.

To illustrate the converseness of the angle, FIG. 5 shows an unfolded version of the optical system, that is, one in which the mirrors have effectively been removed and the beam has been straightened to make it lie in a straight line. This shows the transmission filter and the reflection filter lying at opposite angles to the beam proper. This is the situation which is managed in the physical configuration of FIG. 4.

Only the red color channel is shown. It is assumed that in a typical color television camera conventional means are provided for the blue and green images. Although some of the same shading effects can occur in these channels, the effect is minor and can be corrected electrically as noted above.

Figure 1:
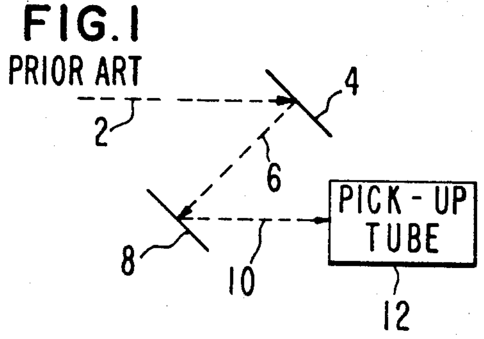
FIG. 1 shows a prior art optical system for separating out the red waveband.
Figure 2:
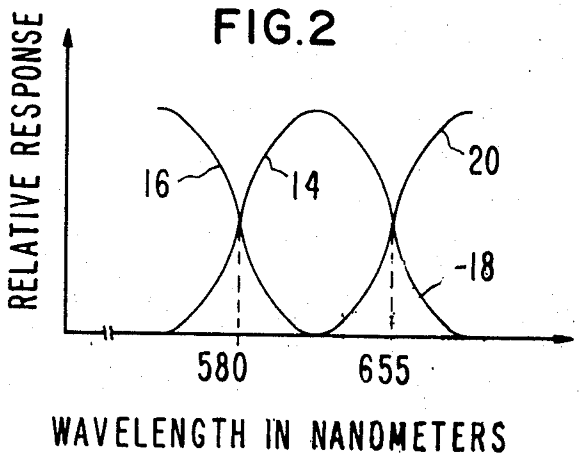
FIG. 2 shows the reflection and transmission characteristics versus frequency of the dichroic mirror of the prior art system of FIG. 1.
Figure 6:
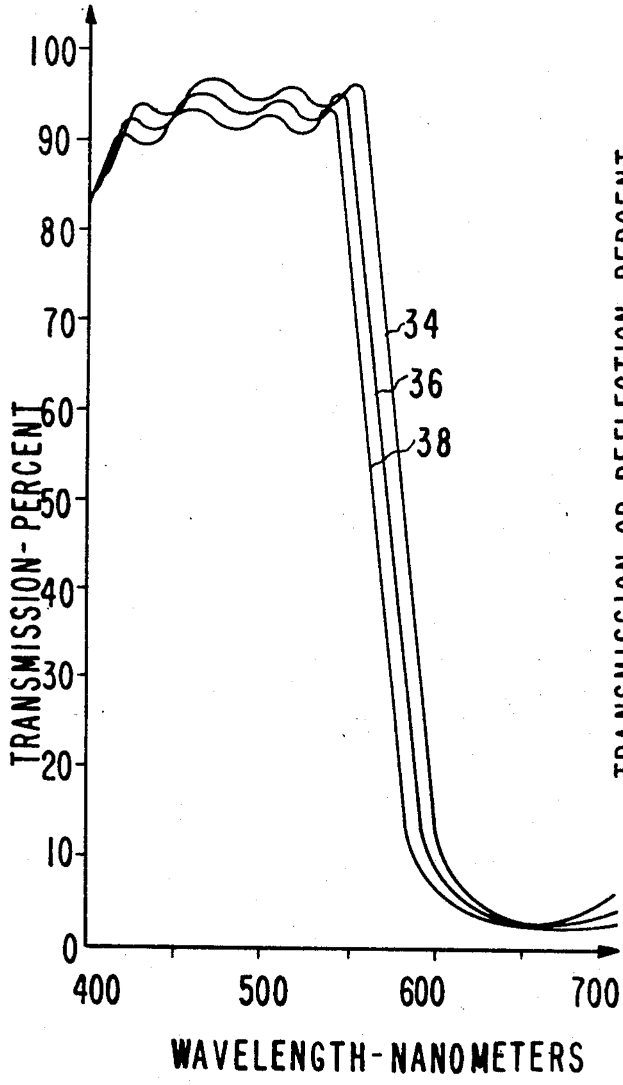
FIG. 6 is a plot showing the transmission characteristics of a dichroic mirror versus wavelength of incident light for three situations where the light is incident on the mirror at three different angles, namely 26°, 32° and 38°.

In order to better understand the operation of the invention, reference is now made to FIG. 6 wherein a typical transmission characteristic of a dichroic mirror is shown. The reflection characteristic may be taken, with a modern dichroic mirror, to be the inverse of this curve, less an absorption which is seldom more than 1%. It will be seen that the mirror has a reflection efficiency of over 90% at wavelengths less than about 540 nanometers and that the reflection efficiency drops off rapidly and approaches zero for longer wavelengths. Curve 34 is the characteristic for a beam forming a 26° angle with the mirror surface, curve 36 for a 32° angle, and curve 38 for a 38° angle. It is apparent that the reflection characteristic is shifted upward to longer wavelengths as the angle of incidence between the beam and the mirror surface decreases. This is the effect illustrated in the discussion of FIG. 2 of the prior art. FIG. 6 shows the angle effects on the mirror pair of FIG. 2 in which one mirror shapes the upper wavelength response and one the lower. FIG. 2, however, shows the composite response of two mirrors.

Figure 7:
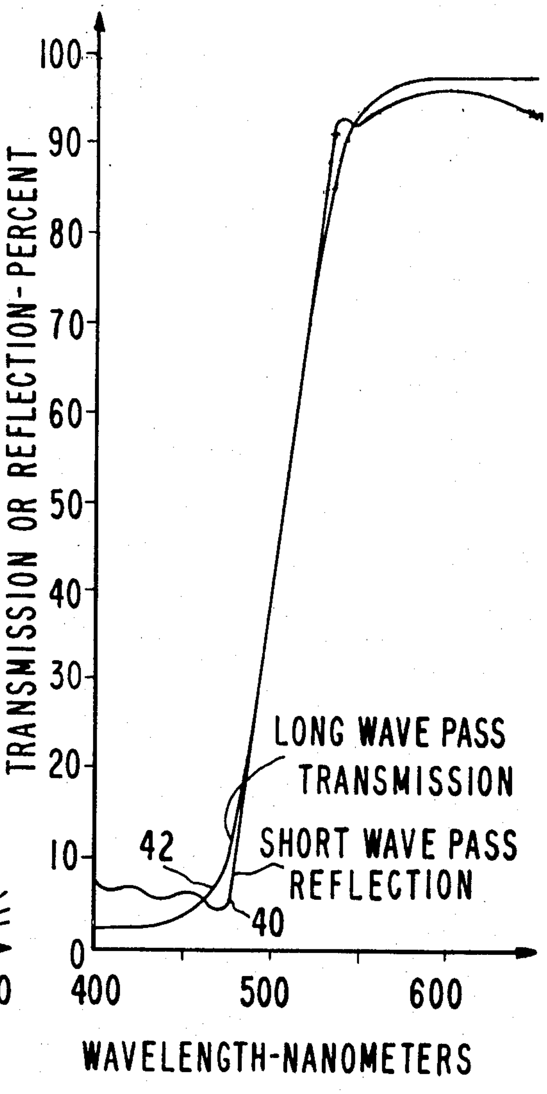
FIG. 7 is a plot of transmission versus wavelength of a long-wave pass transmission filter and a short-wave pass reflection filter which is useful in understanding the invention.

Referring now to FIG. 7, the characteristics of a short-wave pass dichroic mirror having a long-wave-pass reflection characteristic, is shown by curve 40. This would correspond to the left-hand side of the curve in FIG. 2. In addition, the long-wave-pass transmission characteristic of a dichroic transmission filter is shown by curve 42. If, now, the mirror and filter are so arranged that an increase in angle for one corresponds to a like decrease in angle for the other, the combination will have a wavelength response characteristic that is essentially independent of the incidence angle of the beam. It has been found that the arrangement of FIG. 4 using a dichroic mirror and a dichroic transmission filter having approximately the same 50% transmission point and inverse transmission and reflection characteristics results in a case in an optical system wherein the signal from the lead oxide vidicon pickup tube 32 only exhibits a 6% variation in area-to-area shading, compared to 55% shading where the transmission filter is omitted. The preferred embodiment thus employs a short-wave-pass (long-wave-reflection), dichroic mirror 24 which shapes only the shorter wavelength side of the red spectrum, in combination with a dichroic transmission filter 26 having a long-wave-pass characteristic with its 50% transmission point matched to that of mirror 24, the mirror being arranged at complementary angles to the axis of the light beam. It has been found that an exact match of the 50% transmission point is not essential; however the points should be substantially near each other in order that the system will pass the desired light wavelengths.

Figure 8:
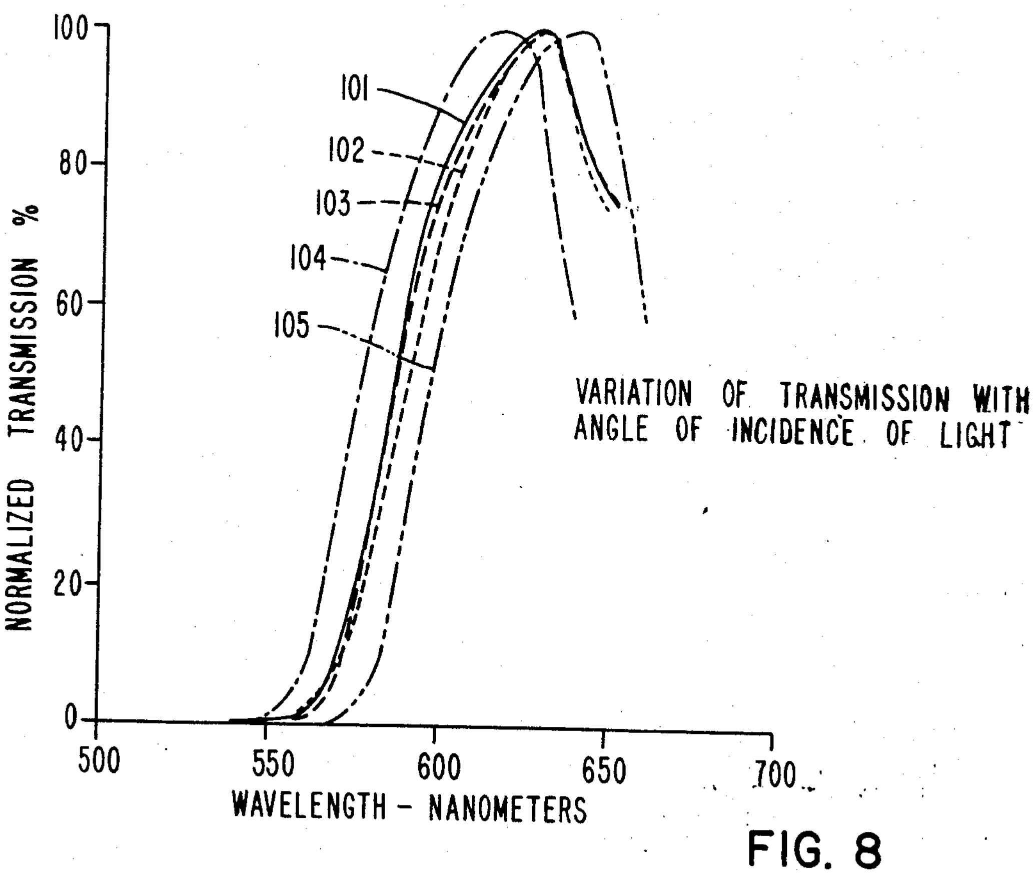
FIG. 8 is a plot of the variation of transmission versus the angle of incidence of light for the embodiment of FIG. 4 with a normal to the beam short-wave pass trimming filter.

FIG. 8 illustrates the results of an arrangement such as shown in FIG. 4. The desired result, of course, is for the transmission characteristic to remain essentially unchanged as the beam incidence angle varies. For the system of FIG. 4, the center of the beam is incident at 32° from the normal (58° from the plane of the mirror). Curve 101 shows the system characteristic for the case of 32°. If the initial angle is decreased 6°, the beam is then incident on reflector 24 at 26° and on the compensating mirror 26 at 38° and curve 102 shows the transmission characteristic for that case. For a 6° increase in initial angle (38° to the reflector 24; 26° to the corrector 26), the characteristic is given by curve 103. It will be noted that curves 101, 102, and 103 are substantially superimposed. Hence the shift in system characteristic as the input incidence angle is varied is virtually eliminated over the range ±6°. In order to appreciate the results of the invention, curves 104 and 105 are shown, which illustrate, respectively, the system characteristic for the case of two red reflectors in tandem at 38° and at 26°.

Figure 9:
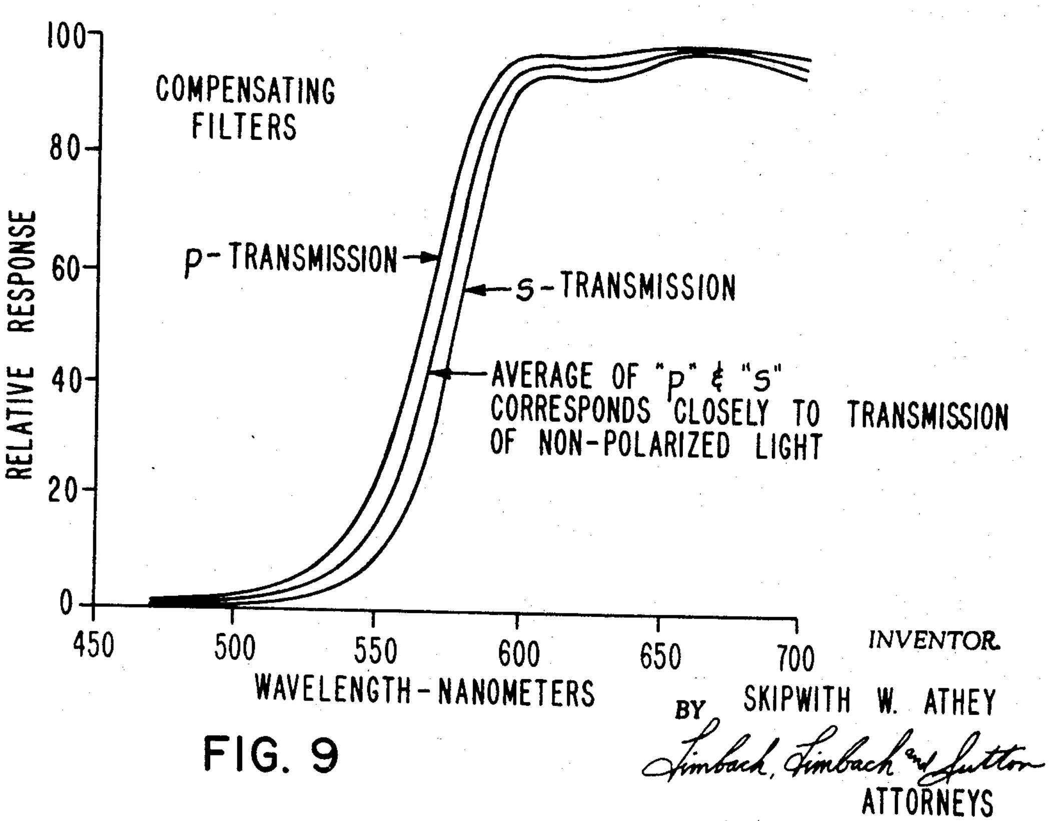
FIG. 9 is a graph of the transmission characteristics of a filter used in the compensation system described here.

In addition to the ability of dichroic multilayer mirrors to reflect and transmit light of various wavelengths selectively, they also possess the property of reflecting light of different polarization differently. This property can be said to derive from the similarity of the multilayer construction of the mirror to the "stack of glass plates" or Brewster polarizer. The selectivity of the mirror is usually described by a plot of relative transmission or reflection for non-polarized light, since for many applications the response to non-polarized light is of greatest practical significance. If the characteristics were measured separately for light polarized in the plane parallel to the reflecting surface and for that polarized in the plane perpendicular to this surface, the results would appear quite different. FIG. 9 shows the transmission of a typical mirror to non-polarized light and to light of the two mutually perpendicular polarizations. (These are calculated data, but a computed response using modern refinements of calculation gives results differing from those measured only at extremes and in parts of the transmission band where the response is irregular, the irregularities resulting from the interaction of opposing effects which do not balance under production conditions as well as they do in calculation.)

Figure 10:
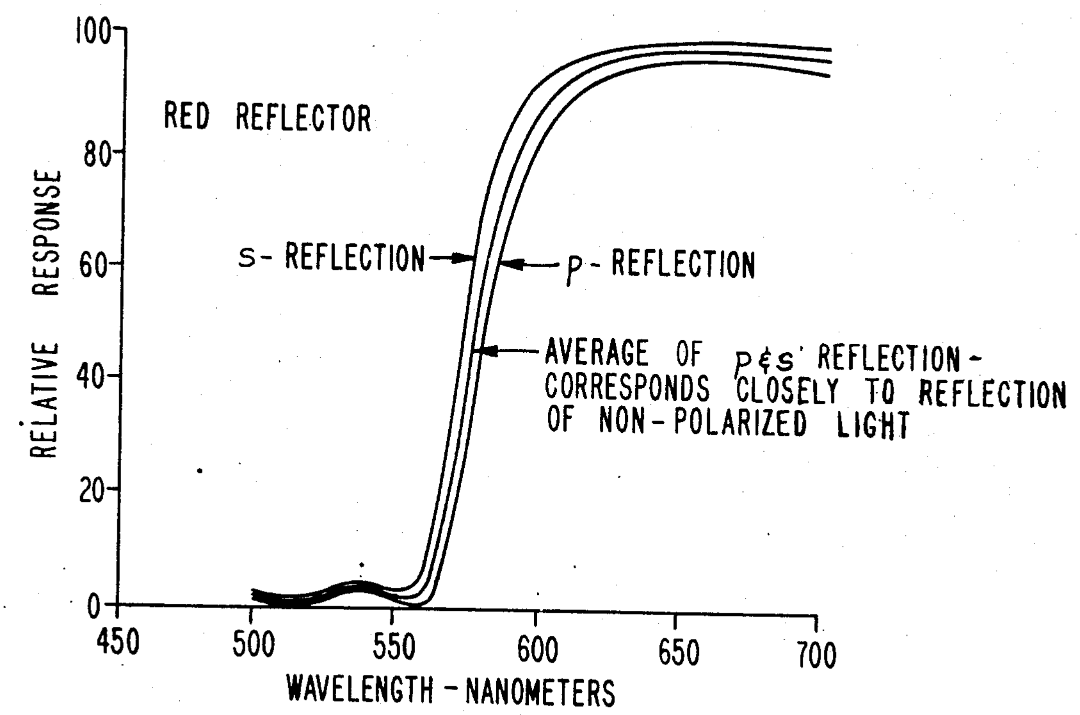
FIG. 10 is a graph of the reflection characteristic of a red-reflector dichroic mirror of the type used in color television camera beam splitters which was designed to minimize polarization effects.

The mirror of FIG. 9 is one which was not designed specifically to minimize the difference in response to light of different polarization. It is possible, however, by using various techniques, beyond the scope of this description and usually proprietary to the manufacturer, to minimize this polarization difference. In FIG. 10 is shown the reflection characteristic of a mirror for which a specific design attempt to minimize polarization effects has been made. Note that although the curves of FIGS. 9 and 10 have a close similarity of shape and are located at almost the same point along the wavelength axis, the separation of the curves for the two planes of polarization is much less for FIG. 10.

FIG. 10 actually represents a red-reflector dichroic mirror which forms part of a color television camera beam splitter and FIG. 9 represents a compensating and matching dichroic filter which was designed for use with the mirror of FIG. 10 to effect the angular effect compensation described hereinbefore. When these two selective devices are used in tandem in a system, the following takes place:

A beam of non-polarized light, or light made up of non-polarized light and partially polarized light of unknown plane of polarization, falls on the red-reflector (FIG. 10). All light, whether polarized or not, which has any component vibrating along the direction parallel to the plane of the mirror, will be reflected by the mirror in the manner shown by the curve marked "*p*." In the same way, any component vibrating at right angles to the plane of the mirror will be reflected in accordance with the curve marked "*s*" (for sagittal, or trying to penetrate the surface like an arrow).

For the second mirror, in the goemetry shown elsewhere, the plane of polarization parallel to the plane of the mirror corresponds to the plane of polarization parallel to the plane of the first mirror. In the same way, the sagittal planes of polarization correspond for the two mirrors. This is a peculiarity of this particular geometry—there are other geometric arrangements which may duplicate this relationship or produce the opposite effect.

Figure 11:
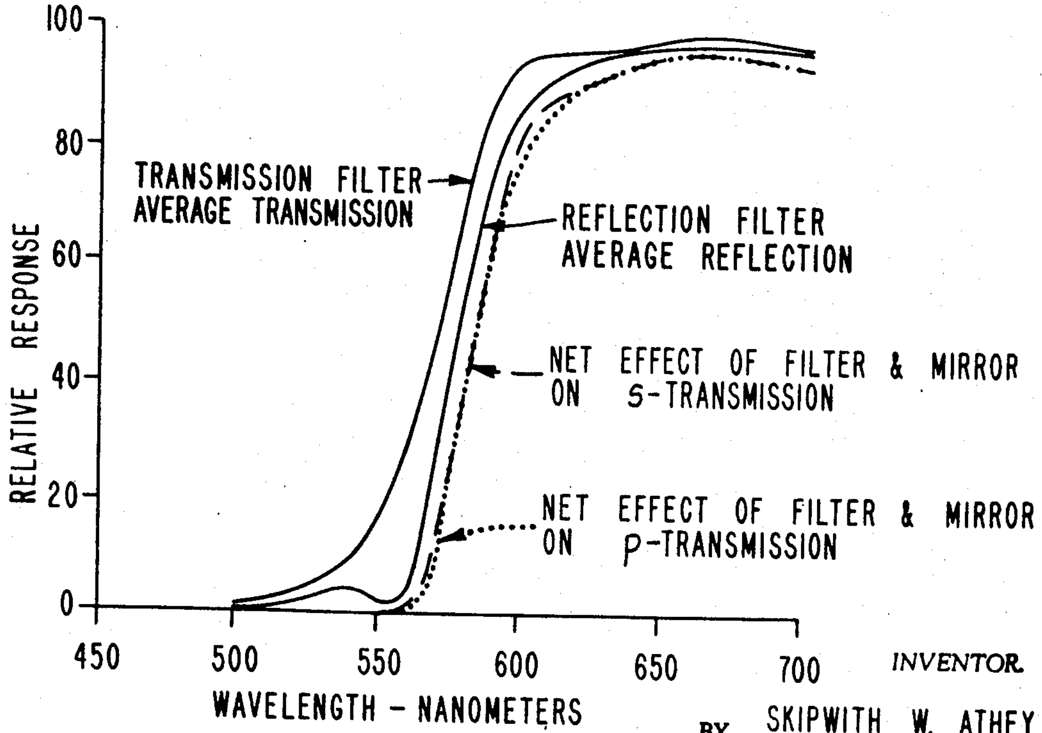
FIG. 11 is a graph of the effects of polarization on two dichroic mirrors in a system.

When the light affected by the "*p*" curve of FIG. 10 encounters the second mirror, it is affected by the "*p*" curve of the second mirror. The light affected by the "*s*" curve of the first mirror is likewise affected by the "*s*" curve of the second mirror. When these two separate consecutive effects are combined by multiplying the ordinates of the curves, two curves, representing the overall selective passage of the two planes of polarization through the system, are obtained. These two curves are shown in FIG. 11, together with two curves obtained by the approximate method of averaging the effects on the two types of polarization before combining the effects of the two mirrors. It is apparent that, to a very close approximation, the net effect on both polarizations is the same.

This cancellation of the different effects on differing polarization can be used in many ways. In the case of the beam-splitter for a color television camera such as set forth in the preferred embodiment, the use of this technique results in absolutely no differenec in color rendition for light whether completely nonpolarized or accidentally partially polarized. The importance of this effect is that many strange quirks of color rendition by color TV cameras, which result when accidentally polarized light is televised, completely disappear. Such accidental polarization occurs, for example, with "backlight" which is reflected at a grazing angle from behind a performer toward the camera when it strikes a performer's hair. Light reflected at a grazing angle from a non-metallic surface is at least partially polarized. Such a "glint-light" is rendered as a peculiar color, usually either green or purple, by the TV camera because the polarization upsets the normal relationship of light reflection in the camera beam-splitter when the latter is built up, as is usually the case, from dichroic mirrors. A similar distortion of color can also happen when highlights are reflected from shiny painted surfaces, such as automobiles.

With the compensation technique described here used in the red-sensitive channel of a particular TV camera with completely polarized light passing into the camera through a polarizing filter, no effect whatsoever is detectable on the signal picked up by the red channel as the polarizer is rotated over the full range of angles of polarization.

A technique which has been recommended in the past for reducing the effect of polarization on TV camera pickup is the use of a quarter-wave plate. Such a plate is a device which splits light passing through it into two components polarized at right angles to each other. As they pass out of the plate, the two components appear to recombine (they actually simply coexist and are in most characteristics indistinguishable from the incoming light). The plate is called "quarter wave" because it delays the phase of one of the separated components by one-quarter wavelength relative to the other. This separation and delay is characteristic of several naturally-occurring substances (mica, one one) and of artificially produced materials with defined axes, such as specially-stressed plastics.

The effect of the separation and delay is to cause the light to be circularly polarized for the particular wavelength for which the delay is exactly one quarter wave. For other wavelengths the delay is a different fraction of a wavelength and the resulting light is said to be elliptically polarized. If the quarter-wave plate is positioned in front of the TV camera so that the two planes of polarization into which the light is resolved are each at 45° with respect to the critical planes of polarization of the dichroic mirrors, as noted above, each of the separate input planes of polarization into the dichroic system will be treated exactly the same by the system. That is, each of the input polarized beams will be at 45° with each of the critical planes of the dichroics. The dichroics will therefore treat each of the component beams the same, and no polarization-related color peculiarities will occur.

This circular-polarization scheme is, however usually inadequate to eliminate polarization anomalies completely, because it only works correctly for one wavelength. For light far away along the spectrum from the spectral line for which the quarter-wave plate is designed, the compensation for polarization effects becomes progressively worse. In attempting to apply this method to the complete visual spectrum from 400 to 700 nanometers, the compensation makes only a slight improvement over unmodified dichroics. However, when the compensating mirror scheme noted above eliminates polarization problems from the red channel of a color TV camera, the quarter-wave plate technique is extremely successful for the other two channels. In an actual camera the effects are as follows:

"White light" applied to camera, polarizer set in front of camera with plane of polarization vertical—camera channels set to give 100% signal level from each color channel.

| Channel | Red | Green | Blue | |
|---|---|---|---|---|
| Initial setting, percent | 100 | 100 | 100 | |
| Worst polarizer rotation | 100 | 126 | 78 | Compensating filter in red channel, no quarter wave plate. |
| Do | 100 | 102 | 104 | Same, with quarter wave plate. |

The reduced polarization effect is essentially undetectable visually.

I claim:

1. In an optical system having a beam axis extending between the system input and the system output, apparatus for reducing area to area shading in said system output comprising dichroic mirror means for substantially reflecting wavelengths above a predetermined wavelength $\lambda_1$, dichroic transmission filter means for substantially transmitting wavelengths above a predetermined wavelength $\lambda_2$, the transmission and reflection characteristics of said filter and mirror, respectively, being inverse, means mounting said dichroic mirror means at an angle $\alpha$, where $\alpha$ is the angle between the axis of said image beam and the normal to said dichroic mirror means, whereby said image beam is reflected, and means mounting said dichroic transmission filter means at substantially an angle $-\alpha$, where $-\alpha$ is the angle between the axis of said image beam and the normal to said dichroic transmission filter means whereby said transmission filter compensates for variations in mirror reflector characteristics produced by rays inclined at different angles to the axis of said image beams.

2. Apparatus according to claim 1 further comprising mirror means for reflecting an image beam, and means for mounting said mirror means in the path of said image beam and parallel to said dichroic mirror means whereby the image beam at the system output is substantially parallel to the image beam at the system input.

3. Apparatus according to claim 2 wherein said wavelengths $\lambda_1$ and $\lambda_2$ are substantially equal.

References Cited

UNITED STATES PATENTS

| | | | |
|---|---|---|---|
| 2,865,245 | 12/1958 | Kelly | 350—166 |

DAVID SCHONBERG, Primary Examiner

T. H. KUSMER, Assistant Examiner

U.S. Cl. X.R.

117—33.3; 350—171, 311

UNITED STATES PATENT OFFICE
CERTIFICATE OF CORRECTION

Patent No. 3,606,521 Dated September 20, 1971

Inventor(s) Skipwith W. Athey

It is certified that error appears in the above-identified patent and that said Letters Patent are hereby corrected as shown below:

Column 2, line 51, "nad" should read -- and --. Column 6, line 32, "one" (first occurrence), should read -- for --.

Signed and sealed this 10th day of October 1972.

(SEAL)
Attest:

EDWARD M.FLETCHER,JR.
Attesting Officer

ROBERT GOTTSCHALK
Commissioner of Patents